United States Patent [19]
Saito et al.

[11] Patent Number: 5,785,268
[45] Date of Patent: Jul. 28, 1998

[54] TAPE CARTRIDGE WITH TAPE TENSION DIFFERENTIAL ATTENUATING TAPE GUIDE ARRANGEMENT

[75] Inventors: Kengo Saito; Masanori Sato, both of Miyagi, Japan

[73] Assignee: Sony Corporation, Japan

[21] Appl. No.: 627,005

[22] Filed: Apr. 3, 1996

[30] Foreign Application Priority Data

Apr. 7, 1995 [JP] Japan ................... 7-082589

[51] Int. Cl.⁶ ................................ G03B 23/02
[52] U.S. Cl. .......................... 242/340; 242/352.4
[58] Field of Search ..................... 242/340, 341, 242/342, 335, 352.4

[56] References Cited

U.S. PATENT DOCUMENTS

| | | | |
|---|---|---|---|
| 1,942,890 | 1/1934 | Wittel | 242/352.4 |
| 3,125,311 | 3/1964 | Willis | 242/352.4 |
| 4,242,709 | 12/1980 | Stricker | 242/352.4 X |
| 4,262,860 | 4/1981 | Hurtig et al. | 242/352.4 X |
| 4,275,424 | 6/1981 | Maxey . | |
| 4,447,019 | 5/1984 | Nagorski | 242/352.4 X |
| 4,474,342 | 10/1984 | Nater | 242/352.4 X |
| 4,575,022 | 3/1986 | Allwine, Jr. et al. | 242/352.4 |
| 4,688,742 | 8/1987 | Hettich | 242/352.4 |
| 4,720,202 | 1/1988 | Kawakami | 242/352.4 X |
| 4,832,283 | 5/1989 | Treff et al. | 242/352.4 |
| 5,289,988 | 3/1994 | Madsen | 242/342 |
| 5,335,131 | 8/1994 | Sato et al. | 242/342 X |
| 5,543,992 | 8/1996 | Hu et al. | 242/352.4 X |

FOREIGN PATENT DOCUMENTS 5097046  7/1980  Japan ................... 242/352.4

*Primary Examiner*—Donald P. Walsh
*Assistant Examiner*—William A. Rivera
*Attorney, Agent, or Firm*—Ronald P. Kananen

[57] ABSTRACT

A tape cartridge is comprised of first and second hubs which are aligned in tandem in a cartridge inserting direction to a recording and regenerating apparatus. A magnetic tape wound around the first and second hubs is driven by a drive belt through tape guides to be pressingly in contact with a magnetic head. The tape guides are arranged so that tape tension characteristics under a forward condition of the tape cartridge become the generally same as those under a reverse condition.

7 Claims, 5 Drawing Sheets

TAPE CARTRIDGE WITH TAPE TENSION DIFFERENTIAL ATTENUATING TAPE GUIDE ARRANGEMENT

BACKGROUND OF THE INVENTION

1. Field of the Invention

The present invention relates to a tape cartridge such as a data cartridge used as an external recording medium of computers, and more particularly to a tape cartridge in which first and second hubs for winding a magnetic tape are aligned in tandem in the direction of a cartridge inserting to a recording and regenerating apparatus.

2. Description of the Prior Art

U.S. Pat. No. 4,262,860 discloses a tape cartridge wherein a supply hub and a take-up hub are aligned in tandem in a tape inserting direction to a recording and regenerating apparatus 201. As shown in FIG. 4 and 5, a tape cartridge 101 comprises a first hub 102 and a second hub 103 which are aligned in a cartridge inserting direction A to a recording and regenerating apparatus 201. A magnetic tape 104 is wound around the first and second hubs 102 and 103. A drive belt 105 is received by a drive roller 106 and first to fourth belt rollers 107 to 110. By driving the drive belt 105, the first and second hubs 102 and 103 are rotated to drive the magnetic tape 104 through first to third tape guides 111 to 113. The magnetic tape 104 is in sliding contact with a magnetic head 202 of the recording and regenerating apparatus 201 and is wound up to one of the first and second hubs 102 and 103. On a base plate 121, the first and second hubs 102 and 103, the drive roller 106, the first to fourth belt rollers 107 to 110 and the first to third tape guides 111 to 113 are mounted. The base plate 121 is formed into a rectangular shape from aluminum material. The first and second hubs 102 and 103 are aligned in tandem on an imaginary center line CL which equally divides front and rear end faces 121a and 121b which are perpendicular to the tape inserting direction A to the recording and regenerating apparatus 201. The drive roller 106 is disposed at a side of the front end face 121a of the base plate 121. The first and second belt rollers 107 and 108 are disposed at a side of a lateral face 121c which is located at a left side of the center line CL in FIG. 4. The third and fourth belt rollers 109 and 110 are disposed at a side of the other lateral face 121d which is located at a right side of the center line CL in FIG. 4. The drive belt 105 between the drive roller 106 and the first belt roller 107 is pressingly in contact with an outer periphery of the magnetic tape 104 wound around the first hub 102. The drive belt 105 between the second belt roller 108 and the third belt roller 109 is pressingly in contact with an outer periphery of the magnetic tape 104 wound around the second hub 104.

The first and second tape guides 111 and 112 are disposed at a side of the front end face 121a so as to locate the drive roller 106 therebetween. The third tape guide 113 is disposed in the vicinity of the third belt roller 109. The first tape guide 111 guides the magnetic tape 104 to be wound around the first hub 102 and to be supplied to the second hub 103. Further, the second tape guide 112 and the third tape guide 113 guide the magnetic tape 104 to be wound around the second hub 103 and to be supplied to the first hub 102. That is, the first tape guide 111 guides a magnetic tape 104 between the first hub 102 and the magnetic head 202. The second and third tape guides 112 and 113 guide the magnetic tape 104 between the magnetic head 202 and the second hub 103. Accordingly, when almost all of the magnetic tape 104 is wound around the first hub 102 so that the wound tape diameter at the first hub 102 becomes maximum as shown in FIG. 4 (forward condition), the total of the tape-guide lap angle at a side of the first hub 102 is simply a tape-guide lap angle (about 80°) of the magnetic tape 104 to the first tape guide 111. The total of the tape-guide lap angles at a side of the second hub 103 from the magnetic head 202 to the second hub 103 is the sum (150°=90°+60°) of the tape-guide lap angle (about 90°) at the second tape guide 112 and the tape-guide lap angle (about 60°) at the third tape guide 113. On the other hand, when almost all of the magnetic tape 104 is wound around the second hub 103 so that the tape wound diameter at the second hub 103 becomes maximum as shown in FIG. 5 (reverse condition), the total of the tape-guide lap angles at the side of the second hub 103 from the magnetic head 202 to the second hub 103 is the sum (130°=90°+40°) of the tape-guide lap angle (about 90°) at the second tape guide 112 and the tape-guide lap angle (about 40°) at the third tape guide 113. Further, the total of the tape-guide lap angle at the side of the first hub 102 is simply the tape-guide lap angle (about 120°) of the magnetic tape 104 at the first tape guide 111. Therefore, the differences between the respective tape-guide lap angles in the forward condition and those in the reverse condition become large. The difference between the tape-guide lap angles generates different frictional resistance between the tape guides 111, 112 and 113 and the magnetic tape 104, and therefore the following troubles are generated.

(1) A large difference of the tape tensioning force between the side of the first hub 102 and the side of the second hub 103 to the magnetic tape 104 is generated in the forward condition and the reverse condition. More particularly, during the reverse condition the minimum value and the maximum value of the tape tensioning force are increased. Since the recording and the regenerating of the signals is executed by pressingly contacting the magnetic tape 104 of the tape cartridge 101 with the magnetic head 202 while the magnetic tape 104 is tensioned, the large change of the tape tension force may causes trouble in the recording and regenerating operations.

(2) Between the forward condition and the reverse condition, the amount of the off-track (vertical tape deviation amount) of the magnetic tape 104 become different. Particularly, the off-track amount during the reverse drive condition is increased and invites trouble such as a jamming which damages to the magnetic tape 104. This degrades the durability and the reliability of the magnetic tape 104.

SUMMARY OF THE INVENTION

It is an object of the present invention to provide an improved tape cartridge which is free from the above-mentioned troubles.

According to a first aspect of the present invention, there is provided a tape cartridge which comprises first and second hubs which are aligned in tandem in the direction of a cartridge inserting to a recording and regenerating apparatus. A magnetic tape is wound around the first and second hubs so as to be movable between the first and second hubs. The magnetic tape between the first and second hubs is pressingly in contact with a magnetic head of the recording and regenerating apparatus to execute recording and regenerating of signals. A drive belt is in contact with the magnetic tape wound around the first and second hubs and is driven to rotate the first and second hubs. A plurality of tape guides guiding the magnetic tape on the way between the first and second hubs. A ratio between a lap angle between the magnetic tape and the drive belt at the first hub and a lap angle between the magnetic tape and the drive belt at the second hub under a condition that a diameter of a wound tape to the first hub is maximum, is the same as that under a condition that a diameter of a wound tape to the second hub is maximum.

According to a second aspect of the present invention, there is provided a tape cartridge which comprises first and second hubs which are aligned in tandem in the direction of a cartridge inserting to a recording and regenerating apparatus. A magnetic tape wound around the first and second hubs so as to be movable between the first and second hubs. The magnetic tape between the first and second hubs is pressingly in contact with a magnetic head of the recording and regenerating apparatus to execute recording and regenerating of signals. A drive belt in contact with the magnetic tape wound around the first and second hubs and driven to rotate the first and second hubs. A plurality of tape guides guide the magnetic tape on the way between the first and second hubs. A ratio between a lap angle between the magnetic tape and the drive belt at the first hub and a lap angle between magnetic tape and the drive belt at the second hub under a condition that a diameter of a wound tape to the first hub is maximum, is the same as that under a condition that a diameter of a wound tape to the second hub is maximum.

DETAILED DESCRIPTION OF THE INVENTION

Figure 1:
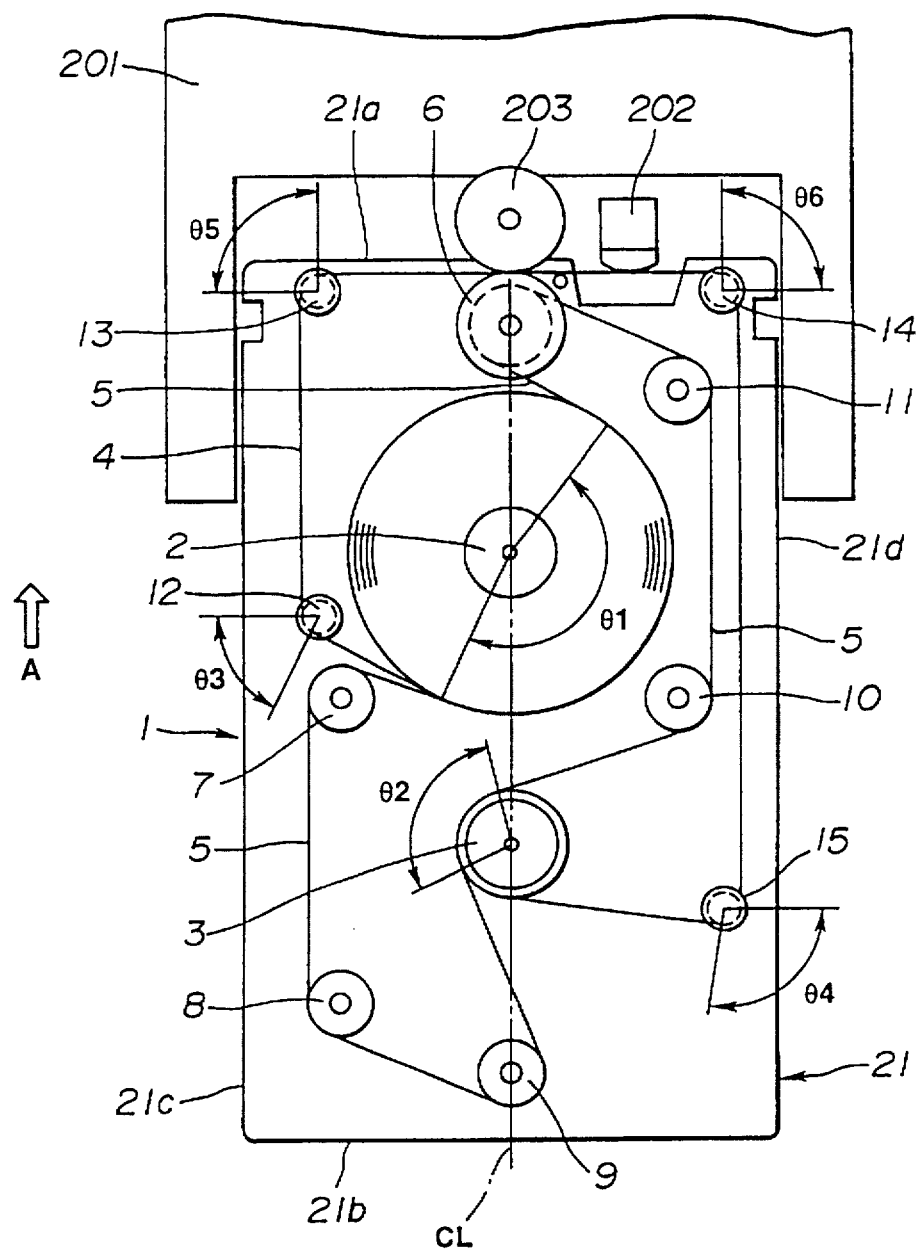
FIG. 1 is a plan view of a tape cartridge according to the present invention.
Figure 2:
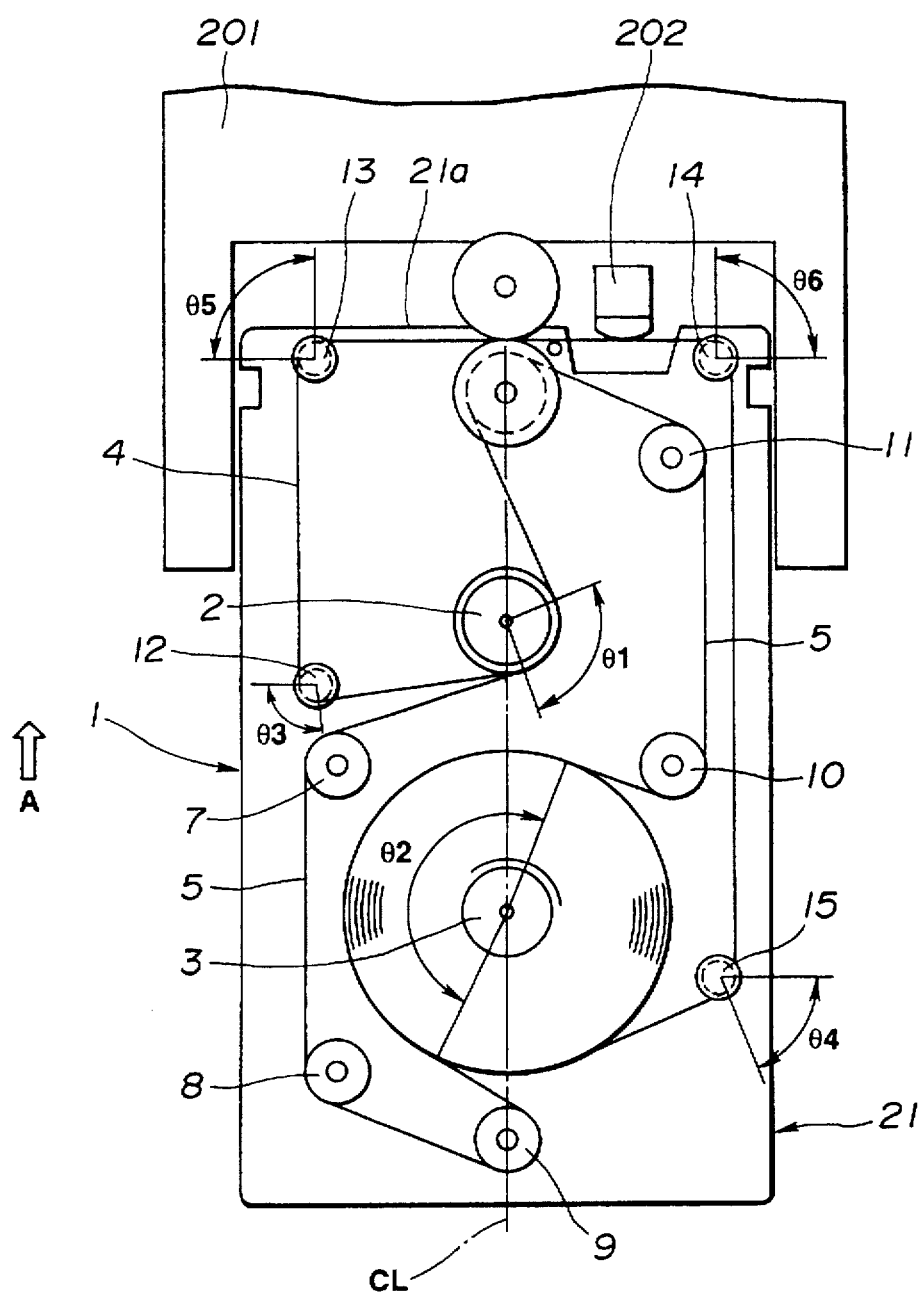
FIG. 2 is a plan view of the tape cartridge of FIG. 1 but different in a tape wound condition.

Referring to FIGS. 1 and 2, there is shown an embodiment of a tape cartridge 1 according to the present invention.

FIG. 1 shows the tape cartridge (or data cartridge) 1. The tape cartridge 1 comprises the first hub 2 and a second hub 3 which are aligned in tandem in an inserting direction A of the tape cartridge 1 to a recording and regenerating apparatus 201 as shown by an arrow of FIG. 1. The magnetic tape 4 is wound around the first and second hubs 2 and 3. In the illustrated arrangement, all of the tape is shown wound onto a first reel which is associated with the first hub 2. Outer peripheral surfaces of the magnetic tape 4 wound on the first and second hubs 2 and 3 are partially lapped with a drive belt 5 of an endless type. The drive belt 5 is guided by first to fifth rollers 7 to 11. By driving the drive belt 5 by means of a capstan roller 203 of the recording and regenerating apparatus 201, the first and second hubs 2 and 3 are rotated, and the magnetic tape 4 from the first hub 2 is driven upon being guided by the first to fourth tape guides 12 to 15. Further, the recording and regenerating of signals is executed by pressing the magnetic tape 4 against a magnetic head 202 of the recording and regenerating apparatus 201, while the magnetic tape 4 is fed from one hub to the other.

The first and second hubs 2 and 3, the drive roller 6, the first to fifth belt rollers 7 to 11, and the first to fourth tape guides 12 to 15 are mounted on a base plate 21. The base plate 21 is formed into a rectangular shape from metal or plastic material. The base plate 21 includes a front end face 21a and a rear end face 21b which are perpendicular to the cartridge inserting direction A, as shown in FIG. 1. The first and second hubs 2 and 3, the drive roller 6 and the third belt roller 9 are disposed on an imaginary center line CL which equally divides the front end face 21a and the rear end face 21b.

The drive roller 6 is disposed in the vicinity of the front end face 21a of the base plate 21. The third belt roller 9 is disposed in the vicinity of the rear end face 21b. The first and second belt rollers 7 and 8 are disposed in the vicinity of one lateral side face 21a so as to be aligned in the cartridge inserting direction A. The first belt roller 7 is disposed at a generally intermediate portion between the first hub 2 and the second hub 3. The second belt roller 8 is disposed at a generally intermediate portion between the second hub 3 and the third drive roller 9. The fourth and fifth belt rollers 10 and 11 are disposed in the vicinity of another lateral side face 21d while being aligned in the cartridge inserting direction A. The fourth belt roller 10 is disposed at a portion which is symmetric with that of the first belt roller 7 with respect to the center line CL. The fifth belt roller 11 is disposed at a portion between the driver roller 6 and the first hub 2. The drive belt 5 is received to the drive roller 6 and the first to fifth belt rollers 7 to 11 and is pressingly in contact with an outer periphery of the magnetic tape 4 wound around the first hub 2 between the first drive roller 6 and the first belt roller 7.

When the magnetic tape 4 is wound around the first hub 2 so as to form a maximum diameter (forward condition), a belt-tape lap angle $\theta_1$ becomes about 170° as shown in FIG. 1. The drive belt 5 is pressingly in contact with an outer periphery of the magnetic tape 4 wound around the second hub 3. When the magnetic tape 4 is wound around the second hub 2 so as to form a minimum diameter (forward condition), a belt-tape lap angle $\theta_2$ is about 105° as shown in FIG. 1.

The first and second tape guides 12 and 13 are disposed in the vicinity of the first lateral face 21c while being aligned in tandem in the cartridge inserting direction A. The third and fourth tape guides 14 and 15 are disposed in the vicinity of the second lateral side 21d while being aligned in tandem in the cartridge inserting direction A. The second and third tape guides 13 and 14 are disposed at both end portions of the side of the front end face 21a, respectively, so as to be aligned in the perpendicular direction of the cartridge inserting direction A. The first tape guide 12 is disposed in the vicinity of the first belt guide 7 so that the tape-guide lap angle $\theta_3$ of the magnetic tape 4 to the first tape guide 12 is about 65°. The fourth tape guide 15 is disposed in the vicinity of the second lateral face 21d and between the second hub 3 and the third belt roller 9 so that the tape-guide lap angle $\theta_4$ of the magnetic tape 4 to the fourth tape guide 15 is about 100°.

With the above-mention arrangement of the first to fourth tape guides 12 to 15, the tape-guide lap angle $\theta_5$ of the magnetic tape 4 to the second tape guide 13 is about 90° and the tape-guide lap angle $\theta_6$ of the magnetic tape 4 to the third tape guide 14 is about 90°.

FIG. 2 shows the tape cartridge 4 wherein the magnetic tape 4 is wound around the second hub 3 so that its wound tape diameter becomes maximum while the wound tape diameter to the first hub 2 becomes minimum (reverse condition). When the magnetic tape 4 is wound to the first and second hubs 2 and 3 as shown in FIG. 2, the belt-tape lap angle $\theta_1$ of the drive belt 5 to the magnetic tape 4 wound around the first hub 2 is about 105° and the belt-tape lap angle θ2 of the drive belt 5 to the magnetic tape 4 wound around the second hub 3 is about 170°. The tape-guide lap angle θ3 of the magnetic tape 4 to the first guide 12 becomes about 100°.

As is similar to the condition of FIG. 1, the tape-guide lap angle θ5 of the magnetic tape 4 to the second tape guide 13 is about 90° and the tape-guide lap angle θ6 of the magnetic tape 4 to the third tape guide 14 is about 90° in the reverse condition of FIG. 2. The tape-guide lap angle θ4 of the magnetic tape 4 to the fourth tape guide 15 is about 65°. A cover made of transplant plastic resin is installed on the base plate 21 although not shown in FIGS. 1 and 2.

Next, the functions and advantages obtained by the tape cartridge 1 according to the present invention will be discussed hereinafter.

In the forward condition of FIG. 1, that is, when the wound tape diameter to the first hub 2 is maximum and that of the second hub 3 is minimum, the ratio between the belt-tape lap angles θ1 and θ2 is 170°:105°, and the difference between the belt-tape lap angles θ1 and θ2 becomes larger than 60°.

The sum of the tape-guide lap angles θ3 and θ5 of the side (tape feed side) of the first hub 2 is 155°=65°+90°, and the sum of the tape-guide lap angles θ4 and θ6 of a side (tape wind side) of the second hub 3 becomes 190°=90°+100°. Accordingly, the ratio between the sums is 155°:190°.

A change rate of the total tape-guide lap angle becomes 18.5%=100×(1−(155/190)) which is obtained from the maximum tape-guide lap angle 190° at the tape wind side and the minimum tape-guide lap angle 155° at the tape feed side.

In contrast, when the wound tape diameter of the magnetic tape 4 to the second hub 3 is maximum and that to the first hub 2 is minimum in the reverse condition, the ratio between the belt-tape lap angles θ1 and θ2 is 105°:170°. The sum of the tape-guide lap angles θ4 and θ6 of the tape feed side becomes 190°=100°+90°, and the sum of the tape-guide lap angles θ3 and θ5 of the tape wind side is 150°=90°+65°. Accordingly, the sum of the tape-guide lap angles θ3 and θ5 of the tape wind side and the sum of the tape-guide lap angles θ4 and θ6 of the tape feed side in the condition that the tape wound diameter at the first hub 2 becomes maximizes, are the same as those in the condition that the tape wound diameter at the second hub 3 maximizes.

Figure 3:
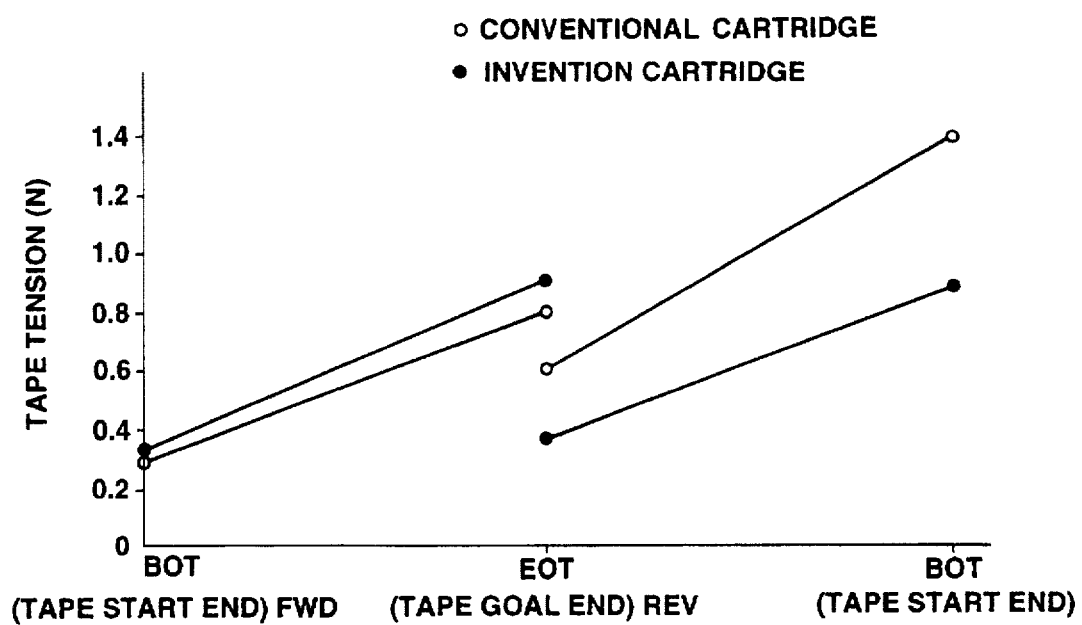
FIG. 3 is a graph which shows characteristics of tape tension in various conditions.
Figure 4:
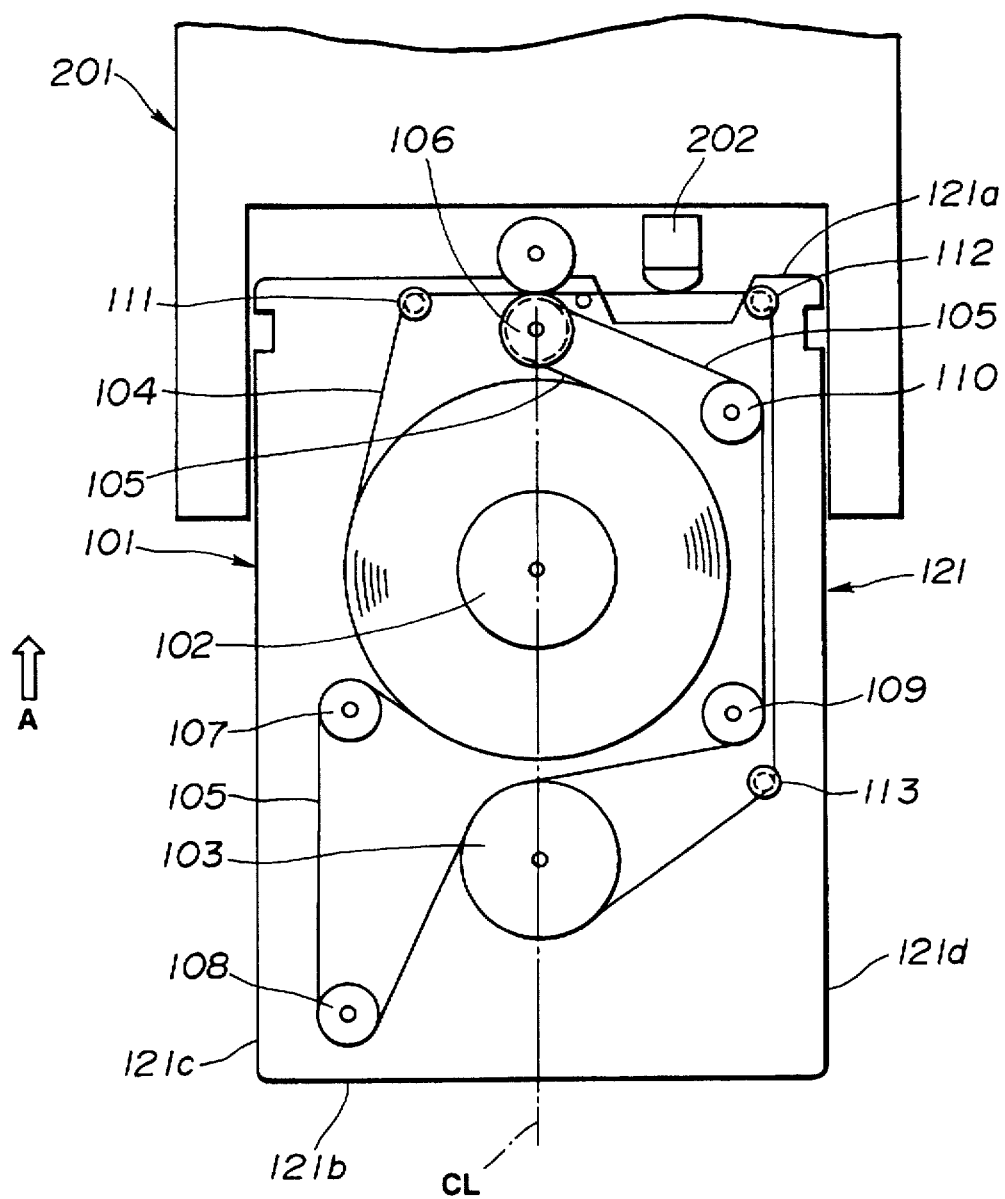
FIG. 4 is a plan view of a conventional tape cartridge.
Figure 5:
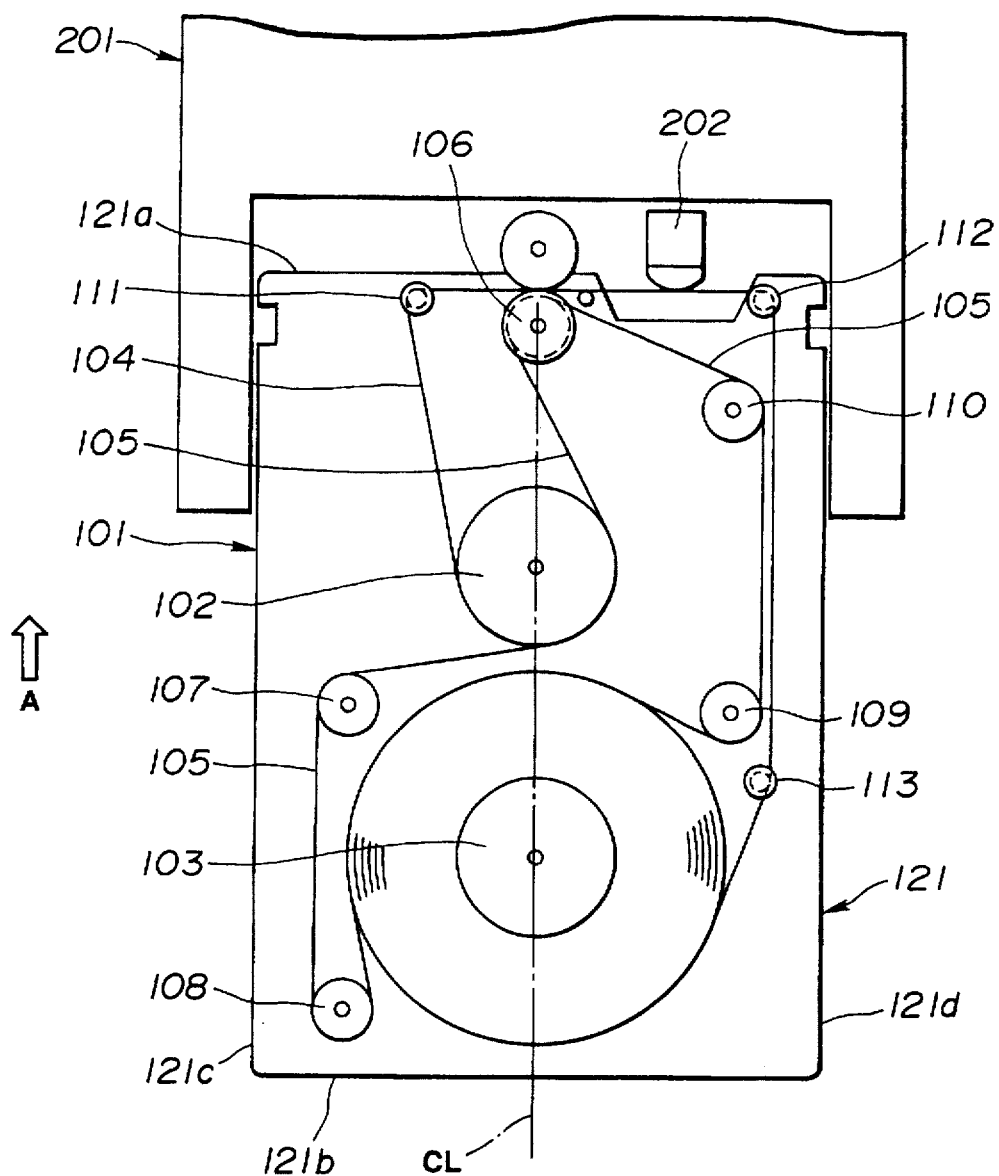
FIG. 5 is a plan view of the conventional tape cartridge of FIG. 4, but different in the tape wound condition.

FIG. 3 shows tape tension characteristics of the tape cartridge 1 according to the present invention and a conventional tape cartridge. As is clear from FIG. 3, by decreasing the minimum tape tension and the maximum tape tension in the reverse condition as compared with those of the conventional tape cartridge, the tape tension characteristics in the reverse condition generally becomes the same as that in the forward condition. Since it was found that if the change rate of the tape-guide lap angle was over 20%, the tape tension characteristics in the reverse and forward operations were degraded. Therefore, the angles θ3 and θ4, and the angles θ5 and angle θ6 may be changed within the condition that the angle change rate is smaller than 20%. This enables the first to fifth tape guides 12 to 15 to be arranged in various pattern which maintain the change rate lower than 20%.

With the thus arranged tape cartridge, the total of the tape-guide lap angles in the forward condition is the same as that in the reverse condition. Therefore, the change of the tape tension characteristics between the forward and reverse condition is suppressed. Further, since the change rate between the total of the tape-guide lap angles at the tape guides guiding the magnetic tape between the first hub and the magnetic head and the total of the tape-guide angles at the tape guides guiding the magnetic tape between the second hub and the magnetic head is arranged to be smaller than 20%, it becomes possible to avoid the change of the minimum tension and the maximum tension in the forward and reverse conditions. Additionally, by arranging the magnetic tape and the drive belt such that the ratio between a lap angle between the magnetic tape and the drive belt at the first hub and a lap angle between the magnetic tape and the drive belt at the second hub under a condition that a diameter of a wound tape to the first hub is maximum is the same as that under a condition that a diameter of a wound tape to the second hub is maximum, the contacting area between the drive belt and the magnetic tape in the forward condition is the same as that in the reverse condition, and therefore the magnetic tape feed is smoothly executed suppressing the off-track amount. Furthermore, by arranging the belt rollers such that a tape-drive belt angle at one of the first and second hubs is larger than 60°, the drive belt and the magnetic tape are reliably in contact with each other without involving lot of air therebetween. This prevents the jamming of the magnetic tape.

While a preferred embodiment according to the invention has been shown and described, it is to be understood that modifications will be apparent to those skilled in the art without departing from the spirit of the invention.

What is claimed is:

1. A tape cartridge for use in a signal recording and generating apparatus comprising:

first and second hubs aligned in tandem in a direction in which the cartridge is inserted into the signal recording and generating apparatus;

a magnetic tape wound around said first and second hubs;

four tape guides for guiding said magnetic tape between said first and second hubs, said four tape guides being arranged so that a when an amount of tape wound on the first hub is maximized, is the same as that when an amount of tape wound on said second hub is maximized;

a drive roller and a plurality of belt rollers; and a drive belt, said drive belt being wound around said drive roller, said belt rollers and said first and second hubs for driving said first and second hubs.

2. A tape cartridge as claimed in claim 1, wherein said sum of the tape-guide lap angles varies by less than 20%.

3. A tape cartridge as claimed in claim 1, further comprising a base plate on which said first and second hubs and said tape guides are mounted.

4. A tape cartridge as claimed in claim 3, wherein the belt rollers are arranged such that a tape-drive belt angle at one of the first and second hubs is greater than angle 60°.

5. (twice amended) A tape cartridge for use in a signal recording and generating comprising:

first and second hubs aligned in tandem in a direction in which the cartridge is inserted into the signal recording and generating apparatus;

a magnetic tape wound around said first and second hubs;

four tape guides for guiding said magnetic tape between said first and second hubs, said four tape guides being arranged so that a ratio between a lap angle defined between said magnetic tape and said drive belt at said first hub and a lap angle defined between said magnetic tape and said drive belt at said second hub when an amount of tape wound on the first hub is maximized is the inverse the same ratio when an amount of tape wound on the second hub is maximized;

a drive roller and a plurality of belt rollers; and a drive belt, said drive belt being wound around said drive roller, said belt rollers, and said first and second hubs for driving said first and second hubs.

6. A tape cartridge as claimed in claim 5, wherein a sum of tape-guide lap angles at the tape guides first hub and the magnetic head and the tape-guide angles at the tape guides when an amount of tape wound on said first hub is maximized is the same as when an amount of tape wound on said second hub is maximized.

7. A tape cartridge as claimed in claim 5, wherein the belt rollers are arranged such that a tape-drive belt angle at one of the first and second hubs is greater than 60°.

* * * * *